United States Patent [19]

Ruta

[11] Patent Number: 4,571,658
[45] Date of Patent: Feb. 18, 1986

[54] CONTROL CIRCUIT FOR A CIRCUIT INTERRUPTER

[75] Inventor: Joseph W. Ruta, Elmhurst, Ill.

[73] Assignee: S&C Electric Company, Chicago, Ill.

[21] Appl. No.: 506,942

[22] Filed: Jun. 22, 1983

[51] Int. Cl.[4] ............................................. H02H 3/093
[52] U.S. Cl. ......................................... 361/96; 361/97
[58] Field of Search ............................... 361/96, 93-95, 361/97, 98

[56] References Cited

U.S. PATENT DOCUMENTS

| | | | |
|---|---|---|---|
| 3,290,556 | 12/1966 | Graham et al. | |
| 3,713,004 | 1/1973 | Skeehan. | |
| 3,831,061 | 8/1974 | Boyd. | |
| 4,017,766 | 4/1977 | Vercellotti et al. | 361/83 |
| 4,149,210 | 4/1979 | Wilson | 361/95 |
| 4,225,777 | 9/1980 | Schindler | 219/497 |
| 4,258,403 | 3/1981 | Shimp | 361/42 |
| 4,259,706 | 3/1981 | Zocholl | 361/96 |
| 4,297,741 | 10/1981 | Howell | 361/93 |
| 4,347,541 | 8/1982 | Chen et al. | 361/96 |
| 4,380,785 | 4/1983 | Demeyer et al. | 361/96 |
| 4,442,472 | 4/1984 | Pang | 361/96 |

OTHER PUBLICATIONS

Keders et al., "A Current-Limiting Device for Service Voltages Up to 34.5kV", Jul. 18, 1976, 7 pages, IEEE PES Summer Meeting, Paper No. 76436-6.
Bottger, "The Application of $I_S$-Limiters in Three Phase Systems", pp. 1-7, 1967, Calor-Emag Company, Germany.
Calor Emag Company, Leaflet No. 1197/6E, "Fault Levels Too High?", 2 pages, date unknown.
M. C. Blythe, "Limiting Fault Currents Between Private and Public Networks", 4 pages, Oct. 5, 1973, reprinted from Electrical Review, Calor-Emag.
N. Miyoshi et al., "Ultra-High Speed Protection Device-Fuji Ultrup Fuse", pp. 47-51, vol. 18, No. 1, Fuji Electric Review.
P. J. Kroon, "The Development and Application of a 69-kV Fault Current Limiter", pp. 237-244, Apr. 1, 1971, 7th IEEE/PES Transmission and Distribution Conference and Exposition.
J. Wafer, "The Impact of Solid-State Technology on Molded Case Circuit Breakers", pp. 605-611, Sep. 10, 1979, vol. IA-16, No. 5, Sep./Oct. 1980, IEEE Transactions on Industry Applications.
"Pyristor Pyrotechnic Systems", Carbone Ferraz, Inc. brochure, date unknown.
"Prototype Fault Current Limiter", EPRI Report, EL-1396, May 1980, pp. 7-1 to 7-19, 8-1, Palo Alto, Calif.

*Primary Examiner*—Harry E. Moose, Jr.
*Attorney, Agent, or Firm*—James V. Lapacek

[57] ABSTRACT

A control circuit is provided for applying energy to operate a circuit interrupter in response to, and a selected time after, the onset of overcurrent in an alternating-current line. The control circuit includes a transducer for producing output current proportional to the current in the line. The power supply includes an energy storage circuit that stores energy derived from the output current. The stored energy, which is maintained within a first range when there is no overcurrent in the line, energizes the power supply. A time-current trip signal generator circuit responds to output current representative of moderate overcurrent in the line by producing a trip signal after the passage of a time period that is inversely related to the overcurrent. An instantaneous trip signal generator circuit produces a trip signal in response to output current between a minimum and a maximum magnitude and increasing at a rate greater than a selected rate, which conditions indicate the presence of high overcurrent in the line. A switch or gate is responsive to either trip signal to apply the output current and the stored energy to the circuit interrupter. With moderate overcurrent in the line, neither the first range of stored energy nor the output current is sufficient to operate the circuit interrupter. Accordingly, the trip signal from the time-current trip signal generator circuit first causes the energy storage circuit of the power supply to store a sufficiently greater amount of energy before operating the switch.

8 Claims, 3 Drawing Figures

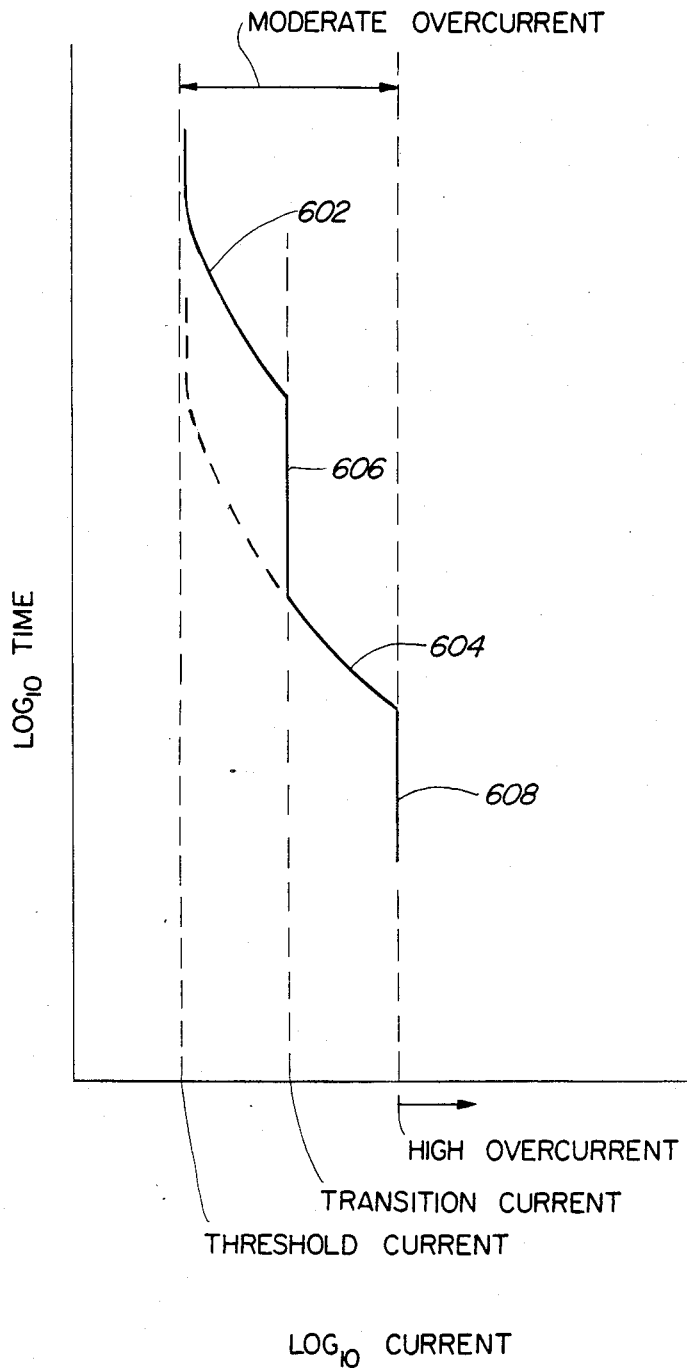

CONTROL CIRCUIT FOR A CIRCUIT INTERRUPTER

BACKGROUND OF THE INVENTION

1. Field of the Invention

The present invention relates to a control circuit for a circuit interrupter and, more specifically, to a control circuit for selectively applying energy to operate a circuit interrupter in response to, and a selected time after the onset of, overcurrent in an alternating-current line in which the circuit interrupter is located. As used herein, "overcurrent" means current exceeding a threshold value. The threshold value may be determined, for example, by the maximum current deemed acceptable in view of the characteristics of the circuit interrupter and of the equipment in the line being protected thereby.

2. Description of the Prior Art

Some prior art protective devices, such as fuses, circuit breakers, circuit switchers, and reclosers, may operate according to an inverse time-current relationship. Specifically, the higher the level of overcurrent in a line, the more quickly the protective device operates. Conversely, the lower the level of overcurrent in the line, the more slowly the protective device operates. Other prior art protective devices respond to overcurrent in the line "instantaneously", that is, with minimum or no time delay after the inception of overcurrent in the line. However, many prior art protective devices do not operate both instantaneously as well as according to an inverse time-current relationship in such a way as to coordinate with other protective devices and damage curves of equipment being protected.

It is therefore an object of the present invention to provide a control circuit that operates according to both an inverse time-current relationship and an instantaneous relationship, the former relationship resulting from "moderate" (as hereinafter defined) overcurrent in a line and the latter relationship resulting from "high" (as hereinafter defined) overcurrent in the line.

Further, it is desirable that the control circuit be of a reasonable size and be as simple as possible so that it is adaptable for various applications and is relatively reliable and inexpensive to manufacture.

Yet another object of the present invention is to provide a versatile control circuit that may be used to control the operation of or otherwise affect a wide variety of devices other than circuit interrupters.

Still another object to the present invention is to provide a control circuit for use with a circuit interrupter or other device and having both a time-current relationship and an instantaneous relationship that are selectively variable to match the damage curves of equipment connected to a line and that can be coordinated with other protective devices in the line.

SUMMARY OF THE INVENTION

With the above and other objects in view, the present invention relates to a control circuit for applying energy to a circuit interrupter or other device in response to, and a selected time after the onset of, moderate overcurrent in an alternating-current line and for applying energy to the circuit interrupter or other device substantially instantaneously with the onset of high overcurrent in the line. As described more fully below, current in the alternating-current line may be interrupted with a minimum possible delay when the onset of high overcurrent is detected, and may be interrupted according to an inverse time-current relationship when a moderate overcurrent is detected. The trip signals produced by the control circuit of the present invention may also be used, for example, to operate or otherwise affect devices such as circuit breakers, reclosers, circuit switchers, alarms, and the like.

The control circuit of the present invention may include a transformer and rectifier, or other suitable transducers, which produce an output current proportional to the current in the line being protected; a power supply having an energy storage circuit; a time-current trip signal generator circuit; an instantaneous trip signal generator circuit; and a switch or gate for applying to the circuit interrupter or other device the energy stored in the energy storage circuit of the power supply. Additionally, the circuit of the present invention may include a time delay circuit for coordinating the operation of the energy storage circuit and the switch in response to a trip signal from the time-current trip signal generator circuit.

The power supply for the control circuit can be of the type described and claimed in the copending U.S. patent application Ser. No. 506,944, entitled "Power Supply for a Circuit Interrupter", assigned to S & C Electric Company, or any other suitable type. The power supply must power-up the control circuit of the present invention and store energy sufficient to reliably operate the circuit interrupter or other device. Energy stored in the power supply may fall within two ranges: a first, lower range, to power the control circuit during normal operation; and a second, higher, range to power the circuit interrupter or other device in response to a trip signal from the time-current trip signal generator.

The time-current trip signal generator circuit can be of the type described and claimed in copending U.S. patent application Ser. No. 658,239, which is a continuation-in-part application of application Ser. No. 506,943, now abandoned, entitled "Trip Signal Generator for a Circuit Interrupter", also assigned to S & C Electric (hereinafter the "First Trip Signal Generator Circuit Application"), which responds to output current signals representative of moderate overcurrent in the line to produce a trip signal after a time delay following the onset of overcurrent. The time delay is inversely related to the overcurrent in the line.

The instantaneous trip signal generator circuit comprises a level detector circuit for detecting the instantaneous value of the current in the line and a circuit for detecting the rate of change of the current in the line. The instantaneous trip signal generator circuit responds to output current signals representing current in the line having an instantaneous value within a "window" (i.e., greater than a first selected level and less than a second, higher, selected level) and having a rate of change greater than a selected rate. When the instantaneous trip signal generator circuit so responds, it produces a trip signal substantially instantaneously with the onset of high overcurrent.

A time delay circuit operates only on trip signals generated by the time-current trip signal generator circuit in order to permit the power supply to increase the amount of energy stored in the energy storage circuit to within a range sufficient to ensure reliable operation of the circuit interrupter or other device.

BRIEF DESCRIPTION OF THE DRAWINGS

FIG. 3 is a generalized curve representing the relationships between time and current that will cause a trip signal to be generated by the control circuit of the present invention.

DETAILED DESCRIPTION OF THE INVENTION

Figure 1:
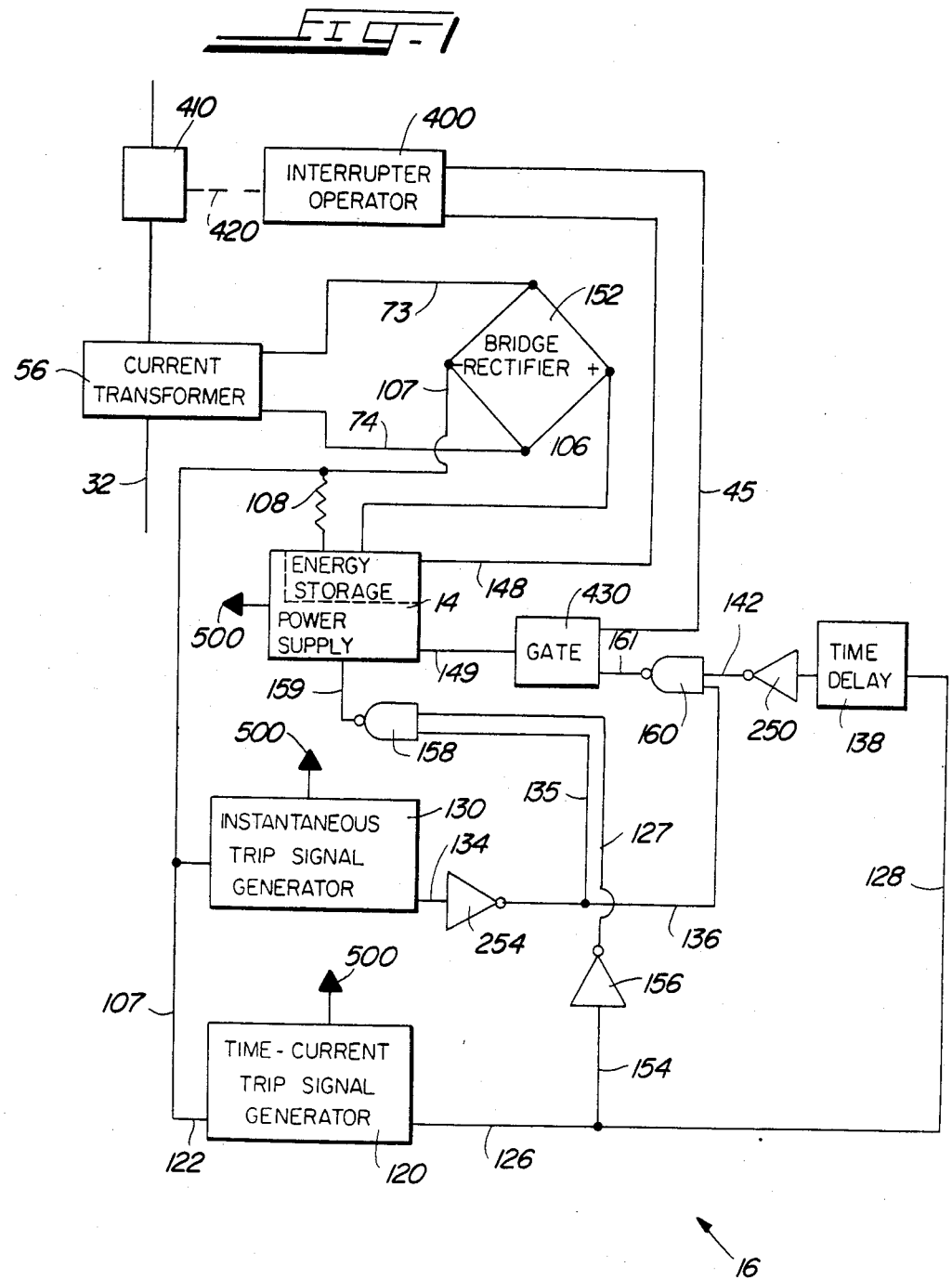
FIG. 1 is a block diagram of the control circuit of the present invention.

Referring to FIG. 1, the present invention relates to a control circuit 16 that applies energy to a device, such as an interrupter operator 400, a selected time after the onset of certain levels of overcurrent in a line 32. The duration of this time delay depends upon the level and other characteristics of the overcurrent and upon the operating characteristics of the control circuit 16, as described below. The application of sufficient energy to the interrupter operator 400 effects the operation thereof, which in turn may cause the operation of a circuit interrupter 410 in the line 32, as illustrated schematically by the dashed line 420. The interrupter operator 400 may be a solenoid, a relay, or, as described below, a power cartridge 22. The interrupter operator 400 also may be, or operate, for example, an alarm.

The control circuit 16 may include a current transformer 56 and a full-wave bridge rectifier 152 which produce on outputs 106 and 107 of the rectifier 152 current signals proportional to the current in the line 32. As one skilled in the art would recognize, suitable means other than the current transformer 56 and the rectifier 152 may be used to provide signals proportional to the current in the line 32.

The control circuit 16 also includes a power supply 14, such as that described in the above-referenced U.S. patent application Ser. No. 506,944, entitled "Power Supply for a Circuit Interrupter," a time-current trip signal generator 120, such as that described in the above-referenced U.S. patent application Ser. No. 658,239, which is a continuation-in-part application of application Ser. No. 506,943, now abandoned, entitled "Trip Signal Generator for a Circuit Interrupter," and an instantaneous trip signal generator 130, described herein.

As described more fully in the foregoing application entitled "Power Supply for a Circuit Interrupter," the power supply 14 includes an energy storage circuit connected to the outputs 106 and 107 for storing energy derived from the current signals thereon. The power supply 14 further contains a switch circuit and a control circuit which maintain the amount of energy stored in the energy storage circuit within a first range when there is no overcurrent in the line 32. The stored energy powers a regulated power supply, which supplies operating power to other portions of the control circuit 16 as generally shown at 500 in FIG. 1. Stored energy within the first range is generally insufficient to reliably operate the interrupter operator 400. When required, energy within a second, higher range is stored for this purpose. Energy within the second range is stored in the energy storage circuit of the power supply 14 only on an "as needed" basis, i.e., only when operation of the circuit interrupter 410 by the energy storage circuit is required. This enables the power supply 14 to operate within a lower energy range during steady state (non-overcurrent) conditions, which lengthens component life and improves circuit accuracy.

The current range over which the control circuit 16 of the present invention operates is illustrated in FIG. 3. What is termed herein "moderate" overcurrent includes current of a magnitude greater than a predetermined threshold value and less than that of a "high" overcurrent. Overcurrent of a magnitude higher than the threshold and lower than a transition is referred to herein as "low moderate" overcurrent. Overcurrent of a magnitude higher than the transition and lower than high overcurrent is referred to herein as "high moderate" overcurrent.

As described more fully in the above-referenced application entitled "Trip Signal Generator for a Circuit Interrupter," the time-current trip signal generator 120 responds to current signals from the rectifier 152 which represent moderate overcurrents in the line 32. As illustrated in FIG. 1, an input 122 of the first trip signal generator circuit 120 is coupled to the rectifier 152 via output 107 and receives therefrom current signals proportional to the current in the line 32. When the time-current trip signal generator 120 receives a current signal on its input 122 representing moderate overcurrent in the line 32, it applies a trip signal to an output 126 thereof after the passage of a time period inversely proportional to the difference between the overcurrent and the threshold current. The start of the time delay is coincident with the onset of overcurrent in the line 32. As described in that application, and as shown in FIG. 3 hereof, the time-current trip generator 120 may include a range selector for providing a different time-current characteristic for low-moderate overcurrent and high-moderate overcurrents. Thus, the time delay may vary inversely with low-moderate overcurrent according to a first portion 602 of a time-current curve, and may vary inversely with high-moderate overcurrent according to a second portion 604 of the time-current curve.

An instantaneous trip signal generator 130, which may be used in conjunction with time-current trip signal generator 120, also responds to current signals on the outputs 107 by indicating the onset of high overcurrent in the line 32, and "instantaneously" applying a trip signal to an output 134 thereof. High overcurrent in line 32 is predicted by the use of two criteria implemented by the instantaneous trip signal generator 130, as explained more fully below. The time at which the instantaneous trip signal generator 130 applies a trip signal to its output 134 may nearly coincide with the onset of a high overcurrent. In this manner, high overcurrents may be interrupted in time to minimize damage to the line 32 and its associated equipment and before such overcurrent has increased to a level that is beyond the capability of the circuit interrupter 410 to interrupt.

A time delay circuit 138 delays a trip signal from the time-current trip signal generator 120 by delaying operation of the gate 430 until the energy stored in the energy storage circuit of power supply 14 is increased to within the second range that is necessary to operate reliably the interrupter operator 400. After the time delay, the gate 430 is operated to apply the increased stored energy to the interrupter operator 400. Thus, for moderate overcurrents, to which the time-current trip generator responds and for which the current signal produced on the output 106 will be insufficient to operate reliably the interrupter operator 400, the time delay circuit 138 ensures that increased energy is stored in the energy storage circuit of the power supply 14 before the gate 430 is operated.

As illustrated in FIG. 1, path 148 runs from one side of the power supply 14 to one side of the interrupter operator 400; path 45, the gate 430 and the path 149 runs from the other side of the interrupter operator 400 and the other side of the power supply 14. When the gate 430 is operated by the time delay circuit 138, a current path 148-149 through the interrupter operator 400 is completed, and energy stored in power supply 14 as well as the current in the output 106 is applied to the interrupter operator 400 via paths 148 and 149.

As noted above, energy within the first range is normally stored in the energy storage circuit of the power supply 14 and is insufficient to operate the interrupter operator 400. When a trip signal is generated on the output 134 of the instantaneous trip signal generator 130 in response to its detection of the onset of high overcurrent in the line 32, the switch circuit in the power supply 14 applies the current signal in the output 106 to the path 148 at approximately the same time that the gate 430 is operated by the trip signal. Even though, at the time of operation of the gate 430, the amount of energy stored in the power supply 14 is itself insufficient to operate the interrupter operator 400, the application of the current signals in the output 106 is sufficient to operate reliably the interrupter operator 400.

The power supply 14 utilizes stored energy within the first range to energize control circuit 16, as shown at 500, to detect and respond to overcurrent in the line 32. If the circuit interrupter 410 and the control circuit 16 are initially connected in line 32 with the current therein below the threshold current, power supply 14 begins to store energy derived from the current signals on the output conductors 106 and 107. At some point, sufficient energy below the first range is stored to achieve proper "power up" of the circuit 16 so that it can accurately determine, via operation of the circuits 120 and 130, the condition of the current in the line 32. Following this, as the circuit 16 operates during steady state (non-overcurrent) conditions, the energy stored in the power supply 14 remains within the first range.

However, if the circuit interrupter 410 and the control circuit 16 are initially connected in line 32 carrying overcurrent, other considerations come into play. First, the interrupter operator 400 cannot be immediately operated because circuits 120 and 130 must first determine if the overcurrent in the line 32 is a moderate overcurrent, or is a predicted high overcurrent. To predict whether the overcurrent will be high, the circuit 130 must determine whether the instantaneous magnitude of the current is greater than a first value and less than a second value, and whether the rate of change of the current is greater than a predetermined rate. For these determinations to be properly made, the control circuit 16, and especially the instantaneous trip generator 130 must be appropriately "powered up." The power supply 14 is configured to achieve this quick "power up" of the control circuit 16 and instantaneous trip generator 130.

The interruption of high overcurrents at their onset is controlled by the instantaneous trip signal generator 130, which responds to high overcurrent before the time-current trip signal generator 120. If the instantaneous trip signal generator circuit 130 does not initiate operation of the interrupter operator 410, because the overcurrent exceeded the second value, the control circuit 16 continues to operate, the instantaneous trip signal generator 130 continues to monitor overcurrent. Since the overcurrent is sinusoidal, later during the same or another cycle of the overcurrent, the rate of change and instantaneous value criteria are met.

When the time-current trip signal generator circuit 120 generates a trip signal (i.e., a high logic state) on its output 126, the trip signal is applied to the time-delay circuit 138 via path 128 and to inverter 156 and thence to one input 127 of a gate 158, which may be a logical NAND gate. The output 134 of the second trip signal generator circuit 130 is connected to the other input 135 of the logical NAND gate 158. When neither trip signal is present on outputs 126 or 134, a high signal is applied to both inputs 127 and 135 of the NAND gate 158. Accordingly, there is normally a low signal present on the output 159 of the NAND gate 158, which is applied to the power supply 14.

Should a high signal on the output 159 of the NAND gate 158 be applied to the power supply 14, the switch circuit of the power supply 14 is operated, regardless of the amount of energy stored in the energy storage circuit of the power supply. Thus, a high signal appears on the output 159 of the NAND gate 158 whenever a high signal, representative of a trip signal, appears on either output 126 or 134.

The output 134 of the instantaneous trip signal generator circuit 130 is also connected by a path 136 to one input of a logic gate 160. The output path 142 of the time-delay circuit 138 is connected to the other output of the logic gate 160. The gate 160 is preferably configured as a logical NAND gate; there is normally (i.e., when the outputs of both the instantaneous trip signal generator 130 and the time-current trip signal generator 120 are low—no trip signal is being generated) a high signal present on each input of the NAND gate 160. Accordingly, a low signal is normally present on its output 161, and results in the normally blocked gate 430 remaining blocked. A high signal on the output 161 results in the gate 430 being operated so as to pass any signal on line 149 to line 45. Such a high signal on the output 161 is produced when a high signal is present on either of the outputs paths 126 or 134, as occurs when either circuit 120 or 130 generates a trip signal.

When the time-current trip signal generator 120 generates a trip signal on its output 126, this signal is applied to one input of the NAND gate 158 via inverter 156 and to the time-delay circuit 138. For purposes of the present discussion, it is assumed the trip signal is applied to the NAND gate 158 in the form of a low signal (due to operation of an inverter 156), which causes the output of the gate 158 to become a high signal. This high signal is fed to the power supply 14 causing the energy storage circuit of the power supply to store therein energy within the second range. The high signal applied to input 128 is delayed by the time-delay circuit 138 and is thereafter applied as a low signal to input 142 of the NAND gate 160. The application of a low signal (due to operation of an inverter 250) to the NAND gate 160 causes its output to become a high signal, which is utilized via its output 161 to operate the gate 430 so as to pass signals from its input 149 to its output 45. During the time delay caused by time-delay circuit 138, energy in the second range has been stored in the energy storage circuit of the power supply 14 and closure of the gate 430 results in operation of interrupter operator 400, circuit interrupter 410, and the interruption of current in line 32.

When the instantaneous trip signal generator circuit 130 applies a trip signal to its output 134, the trip signal, in the form of a low signal (due to operation of an inverter 254) is applied to the inputs 135 and 136 of both gates 158 and 160. This nearly simultaneously causes the switch circuit of the power supply 14 to open, and operation of the gate 430. In this event, although the power supply 14 was not permitted to store energy in the second level therein, as described previously, when the gate 430 is closed, the current signals on the outputs 106 and 107 are sufficiently large to directly and immediately operate interrupter operator 400.

Figure 2:
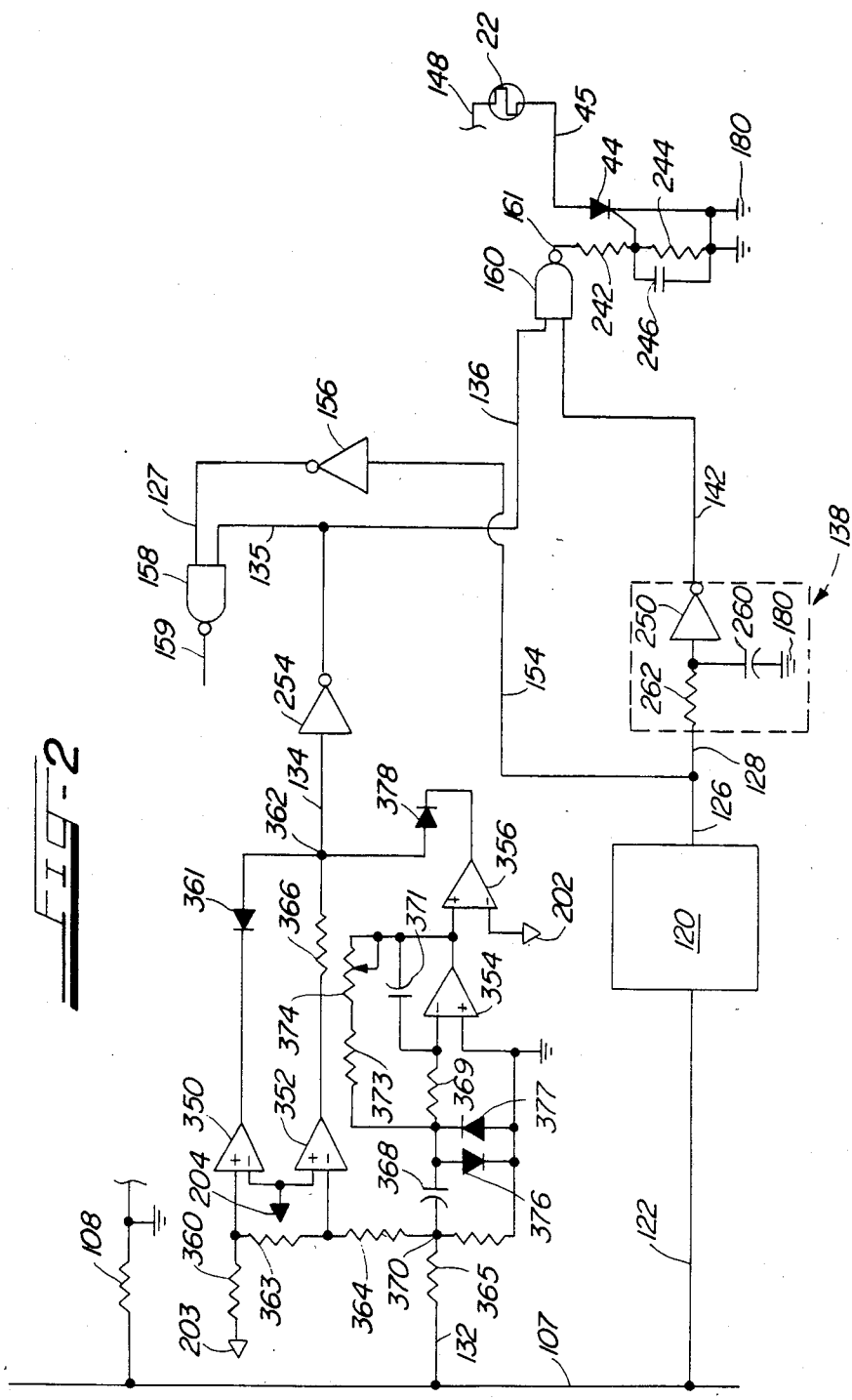
FIG. 2 is a partial schematic diagram of the present invention showing the instantaneous trip signal generator circuit in greater detail.

Referring now to FIG. 2, the gate 430 may be an SCR 44 in series with the input 45 of a power cartridge 22, which may be the specific form of the interrupter operator 400. The gate 430 may be connected to the energy storage circuit of the power supply 14 via path 149. The control electrode of the SCR 44 is connected by a resistor 242 to the path 161 which is the output of the NAND gate 160. Connected between the resistor 242 and the control electrode of the SCR 44 and the circuit common 180 is a parallel combination of a resistor 244 and a capacitor 246. When a high signal is applied to the path 161 and through the resistor 242 to the control electrode of the SCR 44, the SCR 44 is turned "on". With the SCR 44 "off", the energy in power supply 14 and the current signals in the output 106 cannot ignite the power cartridge 22 because the ignition path (shown as 148, 149 in FIG. 1) is discontinuous. With the SCR 44 turned "on", the ignition path 148 is continuous and the energy in power supply 14 and the current signals in the output 106 is applied to the power cartridge 22. The resistor 244 and the capacitor 246 serve a noise-suppression function which prevent the SCR 44 from being inadvertently turned "on".

If current below the threshold is flowing in the line 32, the signal present on the output 126 of the time-current trip signal generator circuit 120 is a low signal. This low signal is applied to time delay circuit 138 via path 128, is inverted to a high signal by inverter 250 and is transmitted to one input to NAND gate 160 via path 142. This low signal is also applied to inverter 156 via path 154 and the resultant high signal is transmitted to one input of NAND gate 158 through path 127. Furthermore, a low signal is normally present on the output 134 of the circuit 130. This low signal is passed through an inverter 254 and the resulting high signal is applied to the other inputs of the NAND gates 158 and 160. Thus, with current below the threshold in the line 32, each NAND gate 158 and 160 has applied to both inputs a high signal. As a consequence, during steady state the outputs 159 and 161 of the NAND gates 158 and 160 have a low signal thereon. The low signal normally on the output 161 of the NAND gate 160 holds the SCR 44 "off". Accordingly, the ignition path for the power cartridge 22 is open.

If moderate overcurrent is in the line 32, after the time period, which is inversely proportional to the difference between the overcurrent and the threshold current, a high signal appears on the output 126. This high signal, which is the trip signal of circuit 120, is applied to both inverters 250 and 156. The high signal applied to the inverter 156 is converted thereby to a low signal, which is thereafter applied (along 127) to one input of the NAND gate 158. As a consequence, the output 159 of the NAND gate 158 carries a high signal. As described in the Power Supply Application, the application of this high signal permits the power supply 14 to store energy within at the second range and is capable of reliably igniting the power cartridge 22. Because it takes some time for the power supply 14 to store the second range of energy it is necessary to delay conduction of the SCR 44. To this end, the high signal on the output 126 of circuit 120 is not applied directly to the inverter 250, but is rather first delayed by a time-delay circuit 138.

Time-delay circuit 138 includes a capacitor 260 and a resistor 262. This resistor 262 is connected between the input of the inverter 250 and the output 126, while the capacitor 260 is connected from the input of the inverter 250 to circuit common 180. The length of time that the high signal on the output 142 is delayed by the time-delay circuit 138 is sufficient to permit the energy in the power supply to reach the second range. Thereafter, the high signal is converted by the inverter 250 to a low signal, which is applied to one input of the NAND gate 160. As a consequence, the output of the NAND gate 160 becomes a high signal, which is applied to the control electrode of the SCR 44 to complete the ignition of the power cartridge 22 and causing the interruption of moderate fault current in line 32.

If high overcurrent occurs in line 32, as defined by the criteria of the instantaneous trip signal generator circuit 130, it effects operation of the power cartridge 22, and the low signal normally on its output 134 becomes a high signal. This high signal is converted by the inverter 254 to a low signal which is applied simultaneously to one input of both NAND gates 158 and 160. Such application of a low signal to the NAND gate 160 immediately effects application of high signal to the control electrode of the SCR 44 and, accordingly, immediately closes the SCR 44 to complete the ignition path between the power cartridge 22 and power supply 14. The low signal applied to one input of the NAND gate 158 transmits a high signal to power supply 14 by path 159 and causes the current signals present on the output 106 to ignite the power cartridge 22.

Referring to FIG. 2, the instantaneous trip signal generator circuit 130 includes four operational amplifiers 350, 352, 354 and 356, and inverter 254. The operational amplifiers 350 and 352 are each used as level detectors and together form a "window detector." The operational amplifier 354 is utilized as a differentiating amplifier, and the operational amplifier 356 is utilized as a level detector.

As one skilled in the art would recognize, a high signal is applied to input 134 of inverter 254 only when all operational amplifiers 350, 352 and 356 simultaneously produce a high signal. Operational amplifiers 350 and 352 operate as a "window detector" and define the upper and lower values of current to which the instantaneous trip signal generator circuit 130 will respond. Operational amplifier 356 operates as a level detector and, in conjunction with operational amplifier 354, defines the rate of change of the current in line 32 which will cause the amplifier 356 to produce a high signal. Operational amplifiers 350, 352, and 356 operate as three inputs to the logical AND gate defined by diodes 361 and 378 and the resistor 366. If any of the operational amplifiers 350, 356 or 352 is low, then a low signal is applied to the inverter 254 and a high signal is applied to one input of NAND gate 158.

Output of the operational amplifier 350 is high if the current in the line 32 is below a maximum value as defined by the voltage of its constant reference voltage 204 and the resistance of associated resistors. If however, the current in line 32 exceeds that value, operational amplifier 350 goes low, node 362 is effectively at circuit common through the diode 361 so that any signals applied to the node 352 are not applied to the output 134, and inverter 254 has a high output signal.

The output of the operational amplifier 352 is low as long as current in the line 32 is below a minimum current value as determined by the voltage of its constant voltage source 204 and the resistance of associated resistors. Should the current in the line 32 exceed the minimum value as determined by the reference voltage and associated resistors of operational amplifier 352, the output of the operational amplifier 352 goes high. Should the output of the operational amplifier 352 go high, but the output of the operational amplifier 350 be low, the high signal present on the output of the operational amplifier 352 is at circuit common through the operational amplifier 350. Accordingly, operational amplifiers 350 and 352 determine a "window" for the minimum and maximum current values in the line 32 to which the interrupting device will respond.

The operational amplifier 354 is used as a differentiating amplifier. The voltage on the output of the operational amplifier 354 is proportional to the instantaneous rate of change of the voltage signals at the node 370 with respect to time. Voltage is present on the output of the operational amplifier 354 regardless of the magnitude of current in the line 32. However, as the rate of change, di/dt, of the voltage signals at the node 370 (which is proportional to di/dt of current in the line 32) increases, the output of the operational amplifier 354 also increases.

The operational amplifier 356 is used as a level detector to compare the voltage on the output of the operational amplifier 354 with the voltage of constant reference 202. When the rate of rise of the signals present on input 132 exceeds the selected rate, the output of the operational amplifier 354 becomes greater than the voltage applied to the inverting input of the operational amplifier 356, and the normally low output of amplifier 356 goes high. When the output of the operational amplifier 356 is low, the node 362 is effectively at circuit common through operational amplifier 356.

Accordingly, the combination of the diodes 361 and 378 and the resistor 366 operates as a three-input logical AND gate. Specifically, if the outputs of the operational amplifier 350, 352 and 356 are all high, a high signal is applied to node 362 and thereafter is converted by the inverter 254 to a low signal. If the output of any of operational amplifiers 350, 356 or 352 is low, a low signal is applied to the node 362, thus, the output of the inverter 254 is high. The outputs of all three operational amplifiers 350, 352 and 356 are high only when the signals on the input 132 fall within the current limits defined by operational amplifiers 350 and 352, and which has a di/dt greater than the selected rate. In this event, a high signal is applied to the input of the inverter 254, converted to a low signal, and applied to one input to each gate 158 and 160. As already described, a low signal applied in this manner to one input of each NAND gate 158 and 160 effects closure of the SCR 44 so that the signals present on the outputs 106 and 107 are applied to the power cartridge 22 for ignition thereof and interruption of the current in line 32.

Referring to FIG. 3, a vertical portion 608 of the time-current characteristic curve represents the operation of the instantaneous trip signal generator 130. The location of the intersection of the portion 608 with the portion 604 may be varied by varying reference voltage 200 and 204 or the resistors associated with the operational amplifier 350, 352, 354, 356.

While the preferred embodiment of the control circuit has been illustrated and described, it is to be understood that the invention is not limited to the precise construction herein disclosed, and the right is reserved to all changes and modifications coming within the scope of the invention as defined in the appended claims.

I claim:

1. A control circuit responsive to overcurrent in an alternating-current line for operating a device, said control circuit comprising:
   current-producing means for producing an output current proportional to the current in the line;
   power supply means responsive to said output current for storing energy, for selectively providing a source of energy, and for providing operating power outputs;
   first trip signal generator means energized by said operating power outputs and responsive to the output current for producing a trip signal in response to overcurrent in the line after the passage of a time delay that is inversely related to the overcurrent in the line, said power supply means being responsive to the generation of a trip signal by said first trip signal generator means such that the energy stored by said power supply means is increased;
   second trip signal generator means energized by said operating power outputs and responsive to the output current for producing a trip signal when the current in the line has a magnitude greater than a first value and has a rate of change greater than a selected rate;
   switch means responsive to the trip signals from the first and second trip signal generator means for applying energy from said power supply means for operating the device; and
   time delay means responsive to a trip signal from said first trip signal generator means for permitting the amount of stored energy in said power supply means to be increased before the trip signal is applied to said switch means to cause said switch means to apply stored energy from said power supply means to operate the device.

2. The control circuit as claimed in claim 1, wherein said second trip signal generator means does not produce a trip signal except when the magnitude of the current in the line also is less than a second value.

3. The control circuit as claimed in claim 2, wherein said second trip signal generator circuit further comprises:
   level detector means responsive to the output current for detecting the instantaneous value of the current in the line and for producing a window signal when the instantaneous value of the current in the line is greater than the first value and less than the second value;
   differentiating means for detecting the rate of change of the output current and for producing a rate signal when the rate of change of the current in the line exceeds a predetermined rate; and
   gate means for receiving the window signal and the rate signal and for producing the trip signal for said second trip signal generator means when both the window signal and the rate signal are received simultaneously.

4. The control circuit as claimed in claim 3, wherein the first value and the predetermined rate in said second trip signal generator means are selected so as to indicate the onset of overcurrent in the line which will, if not interrupted, be greater than a predetermined value such that a trip signal is generated by said second trip signal generator means substantially instantaneously with the onset of the overcurrent which will be greater than the predetermined value.

5. A control circuit responsive to undesired current conditions in an alternating-current line for operating an interrupting device, the interrupter device having predetermined interrupting capabilities characterized in terms of the instantaneous magnitude of the current at the time of interruption, the control circuit comprising:

first signal generator means responsive to the output current for producing a trip signal in the presence of currents above a predetermined level and after the passage of a time delay that is inversely related to the current in the line; and second trip signal generator means responsive to the output current for producing a trip signal when the current satisfies a predetermined relationship that indicates the onset of current in the line which if not interrupted could exceed a predetermined value, said predetermined relationship including the instantaneous magnitude of the current and the rate of change of the current, said predetermined relationship being defined to coordinate with said first trip signal generating means and said predetermined interrupting capabilities.

6. The control circuit of claim 5 wherein said predetermined relationship is defined by the rate of change of the current exceeding a selected rate and the magnitude of the current exceeding a first level and being less than a second level.

7. The control circuit of claim 6 wherein said predetermined value is the predetermined interrupting capability of the interrupting device.

8. The control circuit of claim 6 wherein said predetermined value is less than the predetermined interrupting capability of the interrupting device.

* * * * *